April 18, 1944.    H. P. DEYARMOND    2,347,087
SAW RETOOTHER
Filed April 21, 1943
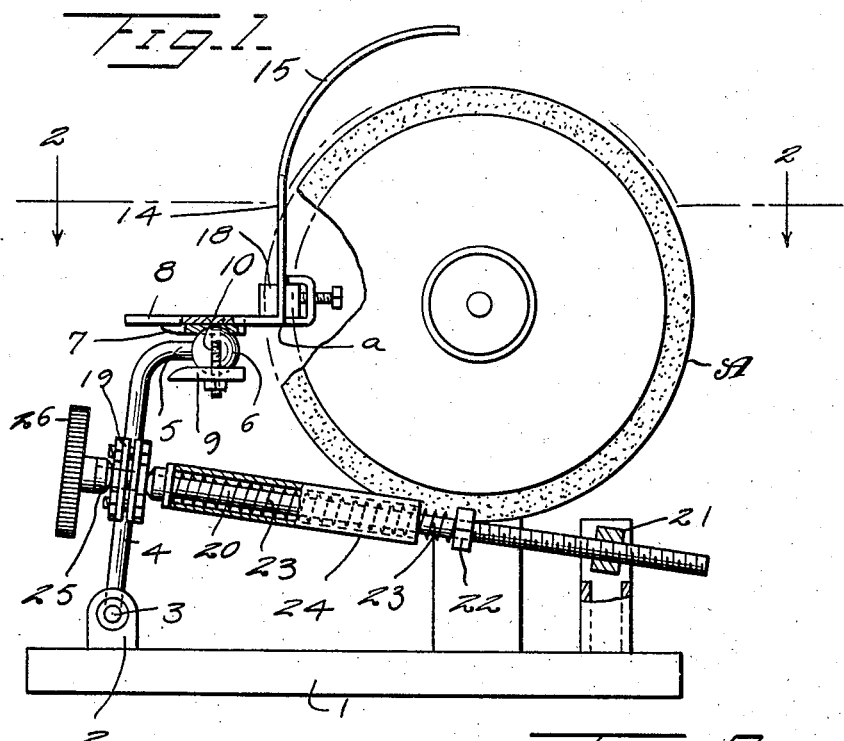
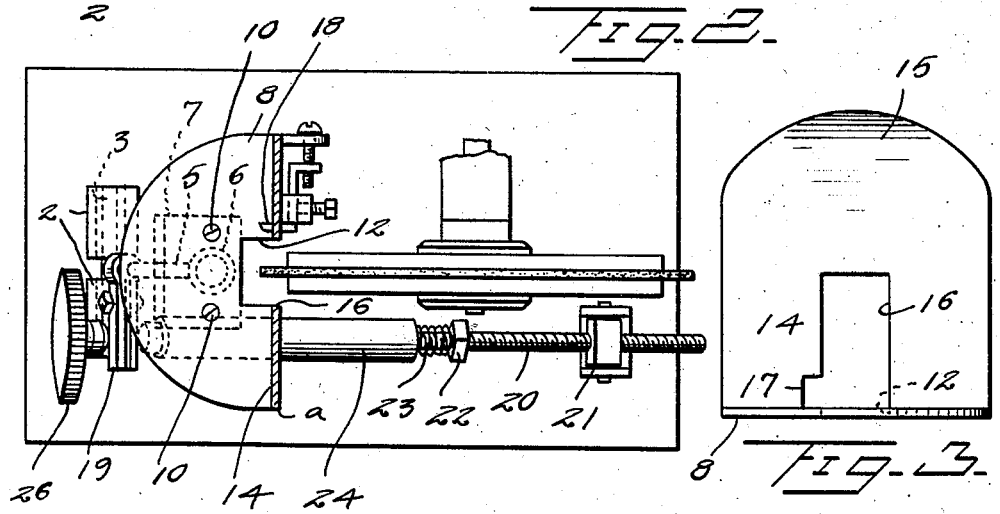
Inventor
Herbert P. Deyarmond
By Wilfred E. Lawson
Attorney Patented Apr. 18, 1944

2,347,087

UNITED STATES PATENT OFFICE 2,347,087

SAW RETOOTHER

Herbert P. Deyarmond, Los Angeles, Calif.

Application April 21, 1943, Serial No. 483,933

2 Claims. (Cl. 76—42)

This invention relates to a saw retoother and has relation more particularly to an apparatus as comprised in my Patent No. 2,294,836 which issued September 1, 1942, and in connection with which the present invention is an improvement.

It is an object of the invention to provide an apparatus of this kind wherein the saw rest comprised therein may be readily and conveniently set at any desired angle with respect to the abrasive wheel.

Another object of the invention is to provide an apparatus of this kind embodying a gauge shaft for adjusting the position of the saw rest toward or from the abrasive wheel and wherein said shaft has associated therewith tension means for coaction with a supporting post for the saw rest to assure effective coaction of the rest with respect to the abrasive wheel, together with means whereby the distance the saw may travel is positively controlled or regulated.

The invention consists in the details of construction and in the combination and arrangement of the several parts of my improved saw retoother whereby certain important advantages are attained, as will be hereinafter more fully set forth.

In order that my invention may be better understood, I will now proceed to describe the same with reference to the accompanying drawing, wherein:

Figure 1 is a view, partly in side elevation and partly in section, illustrating a saw retoother constructed in accordance with an embodiment of the invention.

Figure 2 is a sectional view taken substantially on the line 2—2 of Figure 1, looking in the direction of the arrow, and Figure 3 is an elevational view of the saw rest as herein embodied, unapplied.

As disclosed in the accompanying drawing, A denotes an abrasive wheel constructed, mounted and operated in the manner particularly disclosed in my issued Patent No. 2,294,836, although I do not wish to be understood as limiting myself to this exact arrangement.

The base plate or member 1 of the apparatus to one side of the axial center of the wheel A is provided with the spaced bearings 2 providing a mounting for the rock shaft 3 disposed in a direction substantially parallel to the axis of the wheel A.

This shaft 3 between the bearings 2 is provided with an upstanding rock post 4 having its upper extremity forwardly and laterally offset at 5 and terminating in a ball 6. This ball 6 has fitted thereon a socket member 7 carried by the under side of a saw rest 8.

This socket member 7 rests upon the ball 6 and underlying said ball is a socket clamping plate 9 through which are freely directed the bolts 10 depending from the saw rest 8. Threaded upon these bolts 10 below the clamping plate 9 are the holding nuts 11.

Upon loosening of the clamping plate 9, the saw rest 8 can be manually adjusted to any angle desired with respect to the post 4 and more particularly with respect to the abrasive wheel A. After the desired universal adjustment has been made, the saw rest 8 will be firmly held in such selected adjustment upon proper tightening of the clamping plate 9 upon the ball 6.

The saw rest 8, as herein disclosed, comprises a flat and substantially circular plate having its straight edge a disposed toward the wheel A and said straight edge marginal portion midway its ends is provided with an open slot or recess 12 to receive the marginal portion of the wheel A.

The straight marginal edge a of the saw rest 8 is defined by an upstanding guard plate 14 having its upper portion 15 so formed as to overlie the wheel A. This guard plate 14 in its lower part is provided with an elongated slot or recess 16 communicating with the slot or recess 12 of the saw rest 8 and through which the peripheral portion of the wheel A is also adapted to extend.

One of the vertical walls of the recess or slot 16 is provided immediately adjacent to the saw rest 8 with a notch 17 through which extends a gauge tooth 18. This gauge tooth 18 is assembled and mounted and operates in a manner and for the purposes as particularly set forth in my already issued patent hereinbefore referred to and for which reason a detailed explanation of the same is believed to be unnecessary.

The rock post 4 is provided at its upper portion with a laterally disposed plate 19 through which is freely directed an end portion of an elongated gauge shaft 20 and the opposite end portion of this shaft 20 threads through the upper portion of a post 21 positioned at a desired point to the side of the axial center of the wheel A remote from the rock post 4.

Threading upon the gauge shaft 20 inwardly of this post 21 is a nut 22 which constitutes an adjustable stop for the expansible coiled spring 23 encircling the shaft 20 and interposed between this nut or stop 22 and the plate 19. This spring 23 serves to constantly urge the rock post 4 and the saw rest 8 carried thereby away from the wheel A and the tension of the spring 23 may be readily regulated through the medium of the nut or stop 22.

The spring 23 is surrounded by an elongated sleeve 24, one end of which is adapted to have contact with the nut or stop 22 and this sleeve 24 is of a length desired to provide means for limiting the extent of yielding movement of the rock post 4 toward the wheel A. The extent of movement of the rock post 4 away from the wheel A is limited by contact of a collar 25 freely mounted on the shaft 20 with the hub portion of the operating wheel 26 for the shaft 20. This collar 25 is interposed between the operating wheel or member 26 and the plate 19.

It is thought to be clearly aparent from the foregoing that the universal mounting of the saw rest 8 will allow saws from 14 point and coarser to be sharpened without the use of a file as such ball and socket mounting will allow the shifting of the saw rest 8 to cut teeth at any angle desired. It is also to be stated that the wheel A is to be of a thickness desired as determined by the size of the teeth to be sharpened. It is also believed to be obvious from the foregoing that the particular advantage of the present apparatus is that the sleeve 24 provides means for limiting the extent of movement of the saw rest 8 toward the wheel A yet at the same time sufficient rocking movement is allowed to assure an effective working operation.

From the foregoing description it is thought to be obvious that a saw retoother constructed in accordance with my invention is particularly well adapted for use by reason of the convenience and facility with which it may be assembled and operated.

What is claimed is:

1. In a saw retoother including an abrasive wheel, a post mounted adjacent to and in front of the periphery of the wheel for oscillation relative to the wheel, a saw rest mounted on the post, a bracket secured to and extending laterally from the post, a rod loosely extending at one end through the bracket and threaded through a portion of its other end, a nut threaded upon the rod adjacent the said other end and secured in spaced relation with the bracket, a head upon the rod and upon the side of the bracket opposite from the nut, a bearing member interposed between the head and the bracket, a nut threaded on the rod between the first nut and the bracket, and a spring interposed between the second mentioned nut and the bracket and urging oscillation of the post and saw rest away from the wheel.

2. A saw retoother as set forth in claim 1, with a movement limiting sleeve enclosing the rod and the major portion of the spring and interposed between the bracket and the second mentioned nut.

HERBERT P. DEYARMOND.